US006876447B2

(12) United States Patent
Fretel et al.

(10) Patent No.: US 6,876,447 B2
(45) Date of Patent: Apr. 5, 2005

(54) SIGHTING DEVICE AND EMISSION SPECTROMETER WITH INDUCTIVELY COUPLED PLASMA SOURCE COMPRISING SUCH A DEVICE

(75) Inventors: Emmanuel Fretel, Epinay sur Orge (FR); Alain Le Marchand, Le Mesnil Saint Denis (FR); Christophe Pecheyran, Pau (FR)

(73) Assignee: Jovin Yvon S.A.S., Longjumeau (FR)

( * ) Notice: Subject to any disclaimer, the term of this patent is extended or adjusted under 35 U.S.C. 154(b) by 100 days.

(21) Appl. No.: 10/348,337

(22) Filed: Jan. 22, 2003

(65) Prior Publication Data

US 2003/0231307 A1 Dec. 18, 2003

(30) Foreign Application Priority Data

Jan. 22, 2002 (FR) .......................................... 02 00774

(51) Int. Cl.[7] ............................................ G01N 21/73
(52) U.S. Cl. ................................................... 356/316
(58) Field of Search ......................... 356/316; 250/288

(56) References Cited

U.S. PATENT DOCUMENTS 4,999,492 A 3/1991 Nakagawa .................. 250/281
5,426,301 A 6/1995 Turner ........................ 250/288
5,481,107 A 1/1996 Takada et al. .............. 250/281
5,672,868 A 9/1997 Mordehai et al. ........... 250/281
6,122,050 A * 9/2000 Rutzke ....................... 356/316

* cited by examiner

*Primary Examiner*—F. L. Evans
(74) *Attorney, Agent, or Firm*—Arent Fox PLLC

(57) ABSTRACT

This invention concerns a plasma source emission spectrometer to measure a sample comprising an excitation source (2) having a central axis (3) and producing a plasma, an extraction enclosure (4) receiving a beam composed of ions, atoms and electrons (5) derived from the plasma and comprising an optical lens (10) collecting luminous radiations emitted by the ion beam (5). According to the invention, the lens (10) is not exposed directly to the plasma. The invention also concerns a sighting device (100) comprising a metallic structure (13), substantially cylindrical having a first (15) and second (16) faces ranging respectively in a first (17) and second (18) planes. The first face (15) comprises an input aperture (20) for a beam (5) to be analysed and the second face (16) comprises an output aperture (28) for said beam (5). The first plane (17) forms an angle α with the normal of the second plane (18).

22 Claims, 4 Drawing Sheets

SIGHTING DEVICE AND EMISSION SPECTROMETER WITH INDUCTIVELY COUPLED PLASMA SOURCE COMPRISING SUCH A DEVICE

This invention concerns a sighting device and an emission spectrometer with inductively coupled plasma source comprising such a device.

Emission spectrometer with inductively coupled plasma source implies sufficient excitation of a sample to be analysed so that it emits detectable radiations. The radiations emitted are then dispersed and analysed spectrometrically in order to determine quantitatively the elementary composition of the sample. This technique is known to provide sensitivity on the concentrations of the elementary species of the order of the ppb (parts per billion), let alone ppt (parts per trillion) for certain elements.

FIG. 1 is a schematic representation of a spectrometer with inductively coupled plasma source as implemented in a device of the previous art. Generally, the sample to be analysed is nebulized 1 and the elements nebulized are driven in the flow of the support gas of the plasma, typically argon. The excitation device of the elements vaporised is an inductively coupled plasma source 2 ("Inductively coupled plasma"—ICP). It constitutes a very high temperature excitation source (7000–8000 K) which vaporises, excites and ionises the atoms. The plasma thus created is lined up with the input axis 3 of an enclosure 4 under partial vacuum. The beam composed of ions, atoms and electrons 5 derived from the plasma is injected into this enclosure 4 through the aperture 6 of a metal cone 7. The pressure difference between the enclosure 8 where the plasma is created (approximately 1 bar) and the enclosure 4 under partial vacuum (typically, 1 mbar behind the cone) enables supersonic extraction of the beam composed of ions, atoms and electrons 5. This extraction of the beam 5 through the small cross-section aperture 6 (of the order of 1 $mm^2$) of the cone 7 causes re-ionisation of the elements in the vicinity of the latter. The plasma, composed of atoms, ions and electrons, is pumped by vacuum pumps (mechanical pumps) and forms a beam directed toward a lens 10 placed in the input axis of the particle beam. This lens 10 ensures collimation of the radiations emitted at various wavelengths by the ion beam 5, which are highly energetic toward a spectrometer with a diffraction grating for analysis.

However, the duration of use of this lens 10 is very small because of its direct exposure to plasma. It is therefore necessary to change this lens 10 frequently, which implies high costs.

The objective of this invention is therefore to offer a device whereof the design is simple and the operating mode enables substantial increase in the duration of use of the collimation lens without sensitivity losses for the optical system.

To this end, the invention concerns a plasma source emission spectrometer to measure a sample comprising:

- an excitation source of said sample having a central excitation axis and producing a plasma,
- an extraction enclosure receiving a beam composed of ions, atoms and electrons, derived from the plasma and comprising an optical lens collecting luminous radiations emitted by the atoms and the ions of the beam and delineating an optical collection axis with the input slit of an optical analysis system, According to the invention:

- the lens is not exposed directly to plasma and to the beam composed of ions, atoms and electrons.

This invention also concerns the characteristics which will appear in the following description and which shall be considered individually or according to all their technically possible combinations:

- the central excitation axis is tilted with respect to the collection axis,
- it comprises a sighting device increasing considerably the lifetime of the lens comprising:
  - a substantially cylindrical metallic structure with axial length l and with cross section D having a first and second faces comprised respectively in a first and second planes,
  - said first face comprising an input aperture for a beam to be analysed, and
  - the second face comprising an output aperture for said beam, a metallic flange with diameter d comprising a knife, centred and connected to the metallic structure by a metallic sleeve, said sleeve having a main axis parallel to the normal of the second plane and containing the output aperture of the second face, and in that:
    - the input aperture comprises a cylindrical recess with axial length l' and with cross section d', having a main axis parallel to the normal of the first plane, a first and second open faces, the first face being contained in the first plane,
    - the output aperture comprises a cylindrical recess with cross section d", having a main axis going through the centre of the second face of the cylindrical recess of the input aperture,
    - the first plane forms an angle α with the normal of the second plane,
- the main axis of the cylindrical recess of the output aperture of the sighting device is tilted by an angle β with respect to the normal of the first plane,
- the sighting device has a metallic structure whereof the shorter axial length l is sufficient to provide the mechanical handling of the device,
- the sighting device has an input aperture which is not centred on the first face of the metallic structure,
- the first face of the metallic structure of the sighting device exhibits a first and second threaded cylindrical recesses which do not emerge on the second face,
- the respective centres of the first and second recesses of the sighting device are diametrically opposed on a circle with diameter D' centred on the input aperture,
- the angle α of the sighting device ranges between 5° and 20°,
- the angle β of the sighting device ranges between 1° and 5°,
- the sighting device has a recess formed in the second face between two cylinders centred on said second face, with axial length l" and with respective diameters Ø and Ø'.

The invention also concerns a sighting device comprising a substantially cylindrical metallic structure with axial length l and with cross section D having a first and second faces ranging respectively in a first and second planes, said first face comprising an input aperture for a beam to be analysed and the second face comprising an output aperture for said beam, a metallic flange with diameter d comprising a knife, centred and connected to the metallic structure by a metallic sleeve, said sleeve having a main axis parallel to the normal of the second plane and containing the output aperture of the second face.

According to the invention:

the input aperture comprises a cylindrical recess with axial length l' and with cross section d', having a main axis parallel to the normal of the first plane, a first and second open faces, the first face being contained in the first plane, the output aperture comprises a cylindrical recess with cross section d", having a main axis going through the centre of the second face of the cylindrical recess of the input aperture, and in that:

the first plane forms an angle α with the normal of the second plane.

The invention will be described more in detail with reference to the appended drawings wherein.

Figure 1:
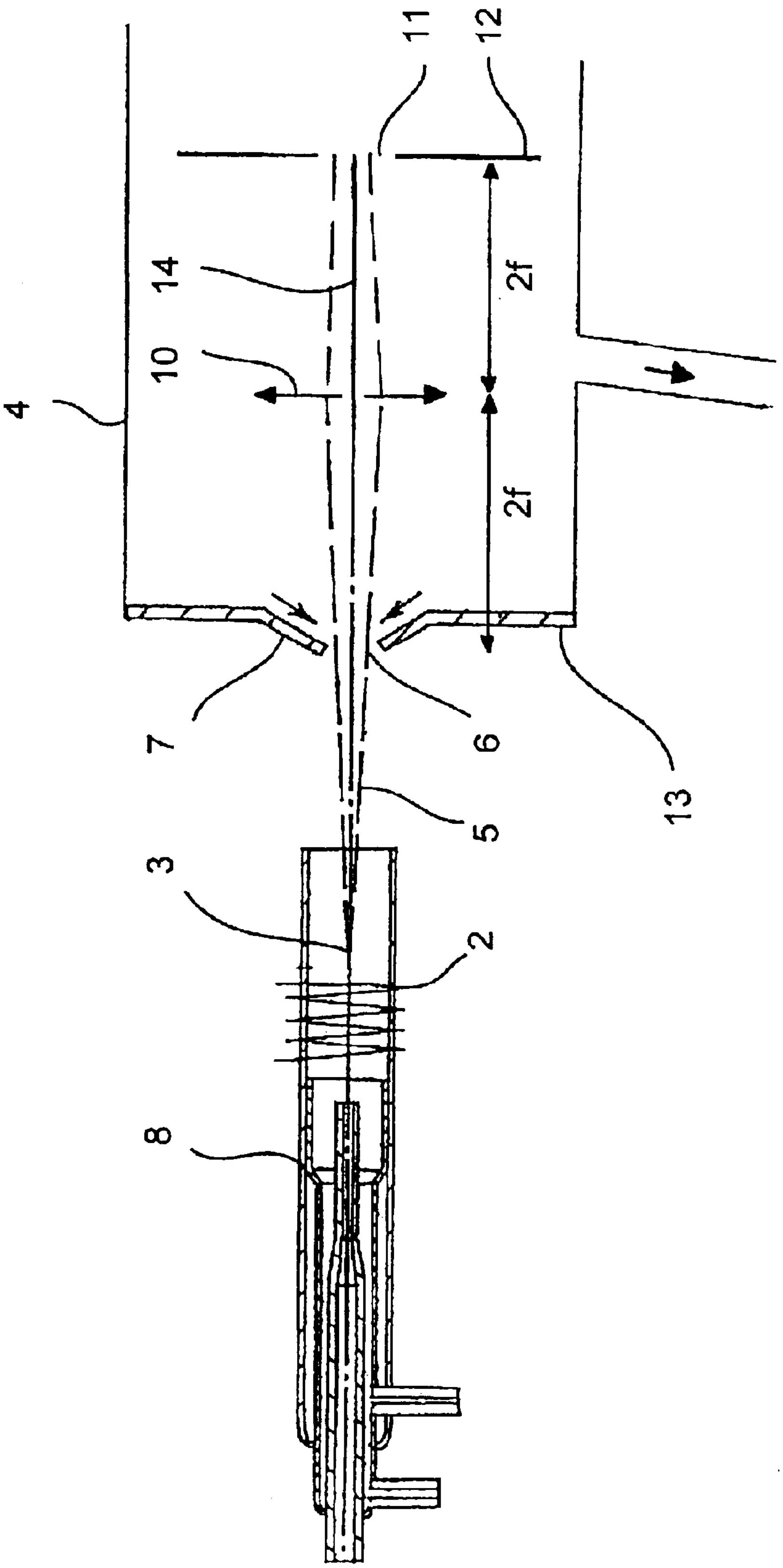
PRIOR ART FIGURE 1
FIG. 1 is a schematic representation of a spectrometer with inductively coupled plasma source of the previous art described above.
Figure 2:
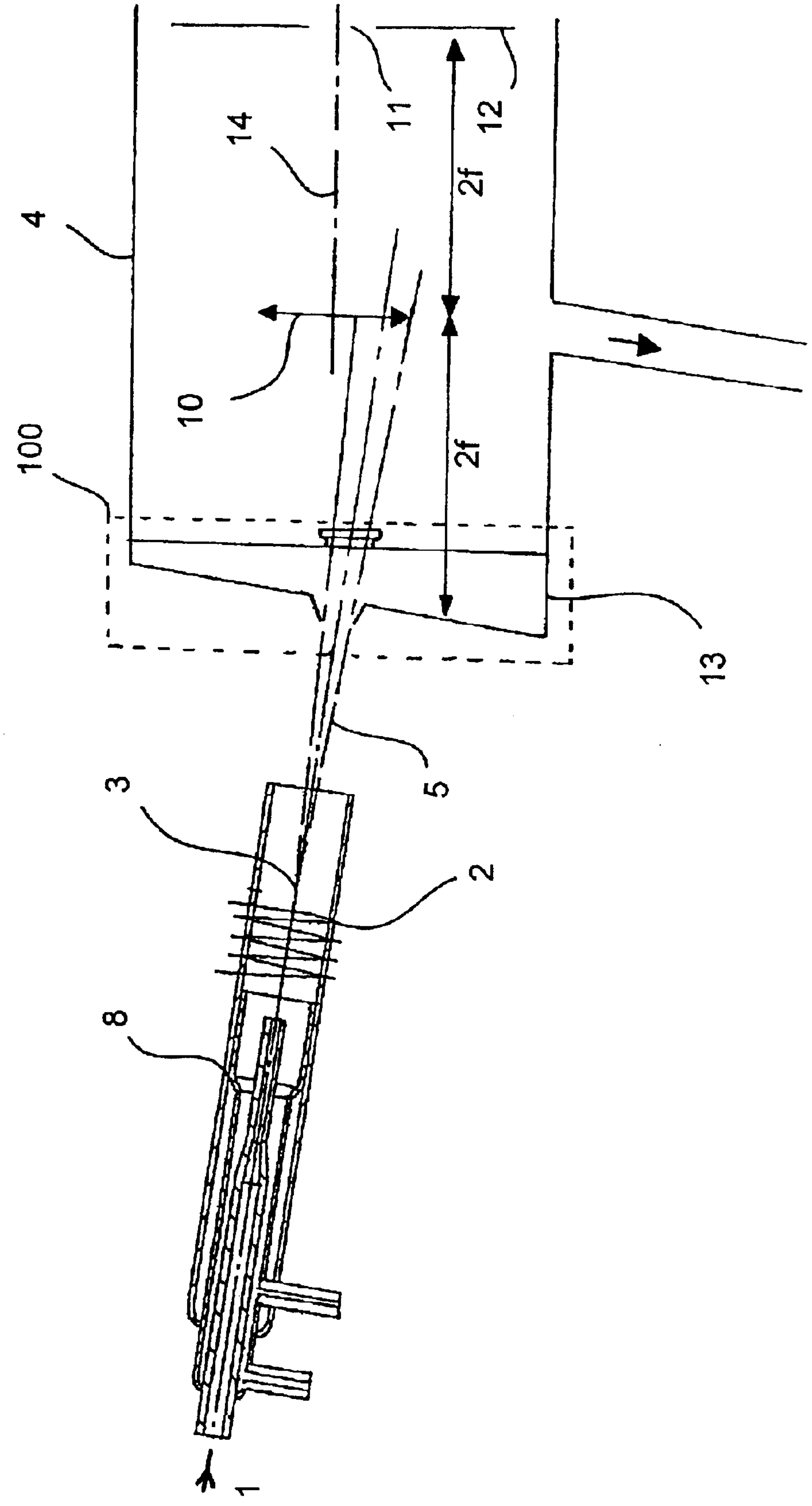
FIG. 2 is a schematic representation of a spectrometer with inductively coupled plasma source with tilted axe, according to the invention.

The jet composed of excited atoms and ions of a sample to be studied, which is generated inside an inductively coupled plasma 2 is analysed according to its central axis 3 thereby conferring to the spectrometer greater sensitivity than that it would have if the emission were collected transversally. The central axis 3 of the plasma is therefore centred on the input aperture 6 of a metal cone 7 and the input slit 11 of an optical analysis system 12. The small section of the aperture 6 of the cone 7 and the pressure difference between the enclosure 8 of the plasma source and the enclosure 4 comprising the optical system provide supersonic extraction of the beam composed of ions, atoms and electrons 5 and turn the flange 13 carrying the cone 7 and separating said enclosures 4 and 8, a sighting device 100.

According to the invention, the sighting device 100 enables the analysis of the axial emission of the jet composed of excited atoms and ions extracted from the plasma by the pressure difference through the metal cone while tilting the beam composed of ions, atoms and electrons 5 with respect to the lens 10 used for collimating the radiations emitted at various wavelengths by said beam 5 in order to protect said lens 10.

The inductively coupled plasma source emission spectrometer, according to the invention, comprises an excitation source 2 of a sample to be analysed having a central excitation axis 3 and producing plasma. It also comprises an extraction enclosure 4 receiving a beam composed of ions, atoms and electrons 5 derived from the plasma. This enclosure 4 exhibits an optical lens 10 collecting luminous radiations emitted by the beam 5 and delineating an optical collection axis 14 with the input slit 11 of an optical analysis system 12. In a preferred embodiment, the lens 10 is not exposed directly to the plasma. A collection of a luminous flow emitted by the ion beam 5 sufficient to provide maximum sensitivity of the spectrometer implies that the lens 10 is placed in the vicinity of the plasma. However, it has been noticed that a direct contact between said lens 10 and said beam composed of ions, atoms and electrons 5 was not necessary to reach such a level of sensitivity. Consequently, we mean here by—non direct exposure—of the lens 10 to plasma, the fact that the lens is placed in order to minimise as much as possible any direct contact with the plasma without losing any sensitivity for the spectrometer. The aperture of the cone 20 is considered like a luminous source point forming an optical axis with the centre of the lens 10 and the input slit 11 of the spectrometer with a diffraction grating. The lens is tilted perpendicular to this axis and is placed halfway between the aperture of the cone 20 and the input slit 11. The distance between the aperture of the cone and the input slit is equal to four times the focal length of the lens 10 (FIG. 1).

Moreover, as the emission of luminous radiations by the highly energetic ions or atoms of the beam does not have any privileged directions, the relative tilting of the central excitation axis 3 with respect to the collection axis 14 does not exhibit significant shortcomings with respect to its advantages. For these reasons and in order to preserve the lens 10 as much as possible, the central excitation axis 3 is advantageously tilted with respect to the optical collection axis 14.

The spectrometer also comprises an optical analysis system for the luminous radiations emitted by the ion beam 5 and means to create a partial vacuum in the extraction enclosure 4. In a preferred embodiment, the partial vacuum in the enclosure 4 is formed by mechanical pumps.

The plasma source emission spectrometer exhibits in a preferred embodiment a sighting device 100. This sighting device 100 according to the invention exhibits advantageously a metallic structure 13, mainly cylindrical with small axial length l and with cross section D having a first 15 and second 16 faces delineated respectively in a first 17 and second 18 planes. According to an embodiment, the diameter D of the metallic structure 13 is 106 mm. A 45° scalloping 19 is realised on a 2 mm width on the second face 16 of said structure 13. The metallic structure 13 is advantageously made of copper. The first face 15 of this structure 13 comprises an inlet aperture 20 for a beam 5 to be analysed. This beam 5 may, in a preferred embodiment, come from a plasma flare and be composed of highly energetic ions, atoms and electrons. The input aperture 18 is centred on the central axis 3 of the plasma. This aperture 20 comprises a cylindrical recess 21 with axial length l' and with cross section d', having a main axis 22 parallel to the normal of the first plane 17, a first and second open faces, the first face being contained in the first plane 17. According to an embodiment, the section of that cylindrical recess 21 is 17.2 mm for a length equal to 4 mm. The input aperture 20 is not centred on the first face 15 of the metallic structure 13. Advantageously, its centre is situated at a distance of the order of 7.5 mm from the centre 23 of said first face 15. The first face 15 of the metallic structure 13 also comprises a first 24 and second 25 threaded cylindrical recesses not emerging on the second face 16. Their respective centres 26–27 are diametrically opposed on a circle with diameter D' centred on the input aperture 20. In an embodiment, D' is equal to 46 mm. The recesses 24–25 are of M6 type with a useful depth of 6 mm. It is thus possible to fix a metal cone 7 having an aperture 6 of approximately 1 mm in diameter in order to insert the beam 5 in the enclosure 4 under partial vacuum. The metal cone 7 is formed in one of the following materials: nickel, copper, platinum, aluminum, gold or any other equivalent material.

The second face 16 comprises an output aperture 28 for said beam 5. This output aperture 28 comprises a cylindrical recess 29 with cross section d" with d" advantageously smaller than d'. According to an embodiment, d" is taken equal to 8 mm. The main axis 30 of this cylindrical recess 29 goes advantageously through the centre of the second face of the cylindrical recess 21 of the input aperture 20. Said axis 30 is tilted by an angle β with respect to the normal of the first plane 17. The angle β ranges between 1 and 5°. In a preferred embodiment, this angle is advantageously taken equal to 3°. The centre 31 of the output aperture 28 is positioned 5.65 mm away from the centre 32 of the second face 16 of the metallic structure 13. A recess 33 is formed in the second face 16 between two cylinders 34–35 centred on said second face 16, with axial length l" and with respective diameters Ø and Ø'. According to an embodiment, Ø and Ø' are taken respectively equal to 30 and 37.5 mm and l" is equal to 2.1 mm. This recess serves as a groove to accommodate a seal. A metallic flange 36 with diameter d comprising a knife 37, is centred and connected to the second face 16 of the metallic structure 13 by a metallic sleeve 38. The main axis 39 of said sleeve 38 is parallel to the normal of the second plane 18. The inner diameter of the flange 36 and of the sleeve 38 is such that they contain the output aperture 28 of the second face 16. According to an embodiment, this diameter is 23 mm.

Figure 3:
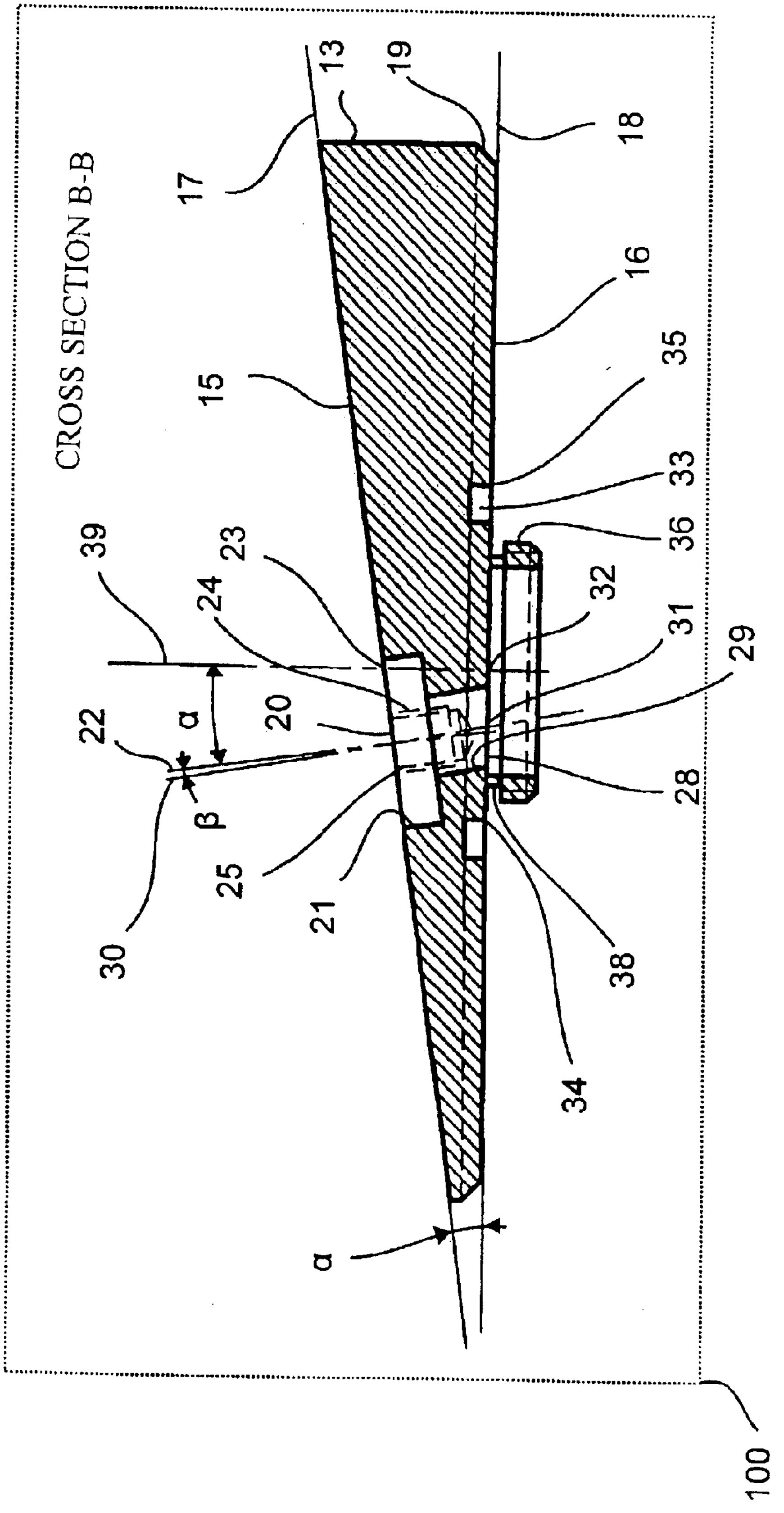
FIG. 3 represents a cross section according to the axis B—B of the sighting device according to the invention.
Figure 4:
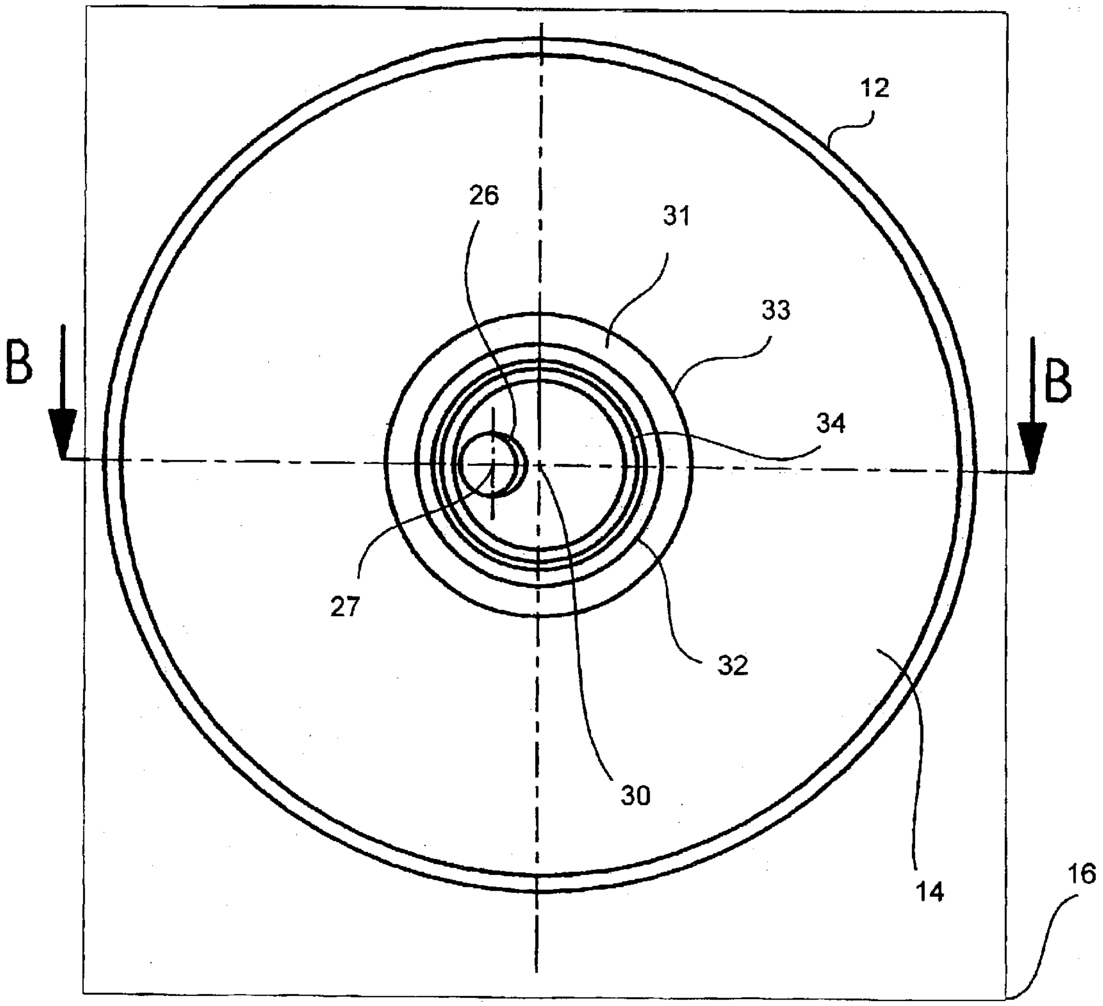
FIG. 4 is a schematic representation of the second face of the sighting device according to the invention.

The first plane 17 (FIG. 3) is tilted by an angle α with respect to the normal of the centre of the second plane 18. The angle α ranges between 5° and 20°. In a preferred embodiment, the angle α is taken equal to 8°. The shorter axial length l of the metallic structure 13 is sufficient to provide mechanical handling of the device.

The invention also concerns a sighting device 100. This sighting device 100 according to the invention exhibits a metallic structure 13, substantially cylindrical with small axial length l and with cross section D having a first 15 and second 16 faces delineated respectively in a first 17 and second 18 planes. According to an embodiment, the diameter D of the metallic structure 13 is 106 mm. The metallic structure 13 is advantageously made of copper. The first face 15 of this structure 13 comprises an inlet aperture 20 for a beam 5 to be analysed, centred on the central axis 3 of the plasma. This aperture 20 comprises a cylindrical recess 21 with axial length l' and with cross section d', having a main axis 22 parallel to the normal of the first plane 17, a first and second open faces, the first face being contained in the first plane 17. According to an embodiment, the section of this cylindrical recess 21 is 17.2 mm for a length l' equal to 4 mm.

The second face 16 comprises an output aperture 28 for said beam 5. This output aperture 28 comprises a cylindrical recess 29 with cross section d" with advantageously d" smaller than d'. According to an embodiment, d" is taken equal to 8 mm. The main axis 30 of this cylindrical recess 29 goes advantageously through the centre of the second face of the cylindrical recess 21 of the input aperture 20. Said axis 30 is tilted by an angle β with respect to the normal of the first plane 17. The angle β ranges between 1 and 5°. In a preferred embodiment, this angle is taken equal to 3°. The second face 16 comprises a metallic flange 36 with diameter d comprising a knife 37, centred and connected to the metallic structure 13 by a metallic sleeve 38, said sleeve 38 having a main axis 39 parallel to the normal of the second plane 18. The inner diameter of the flange 36 and of the sleeve 38 is such that they contain the output aperture 28 of the second face 16. According to an embodiment, this diameter is 23 mm. The first plane 17 forms an angle α with the normal of the second plane 18. In a preferred embodiment, the angle α is taken equal to 8°.

What is claimed is:

1. A plasma source emission spectrometer to measure a sample comprising:

an excitation source (2) of said sample having a central excitation axis (3) and producing a plasma, an extraction enclosure (4) receiving a beam composed of ions, atoms and electrons (5) derived from the plasma and comprising an optical lens (10) collecting luminous radiations emitted by the atoms and the ions of the beam (5) and delineating an optical collection axis (14) with the input slit of an optical analysis system, wherein the central excitation axis (3) is offset from the optical collection axis (14), such that a center of the lens (10) is offset from a center of the beam.

2. A plasma source emission spectrometer according to claim 1, characterised in that the central excitation axis (3) is tilted with respect to the collection axis (14).

3. A plasma source emission spectrometer according to claim 2, characterised in that it comprises a sighting device increasing considerably the lifetime of the lens (100) comprising a metallic structure (13), substantially cylindrical with axial length 1 and with cross section D having a first (15) and second (16) faces ranging respectively in a first (17) and second (18) planes, said first face (15) comprising an input aperture (20) for a beam (5) to be analysed, and the second face (16) comprising an output aperture (28) for said beam (5), a metallic flange (36) with diameter d comprising a knife (37), centred and connected to the metallic structure (13) by a metallic sleeve (38), said sleeve (38) having a mail axis (39) parallel to the normal of the second plane (18) and containing the output aperture (28) of the second face (16), and in that:

the input aperture (20) comprises a cylindrical recess (21) with axial length 1' and with cross section d', having a main axis (22) parallel to the normal of the first plane (17), a first and second open faces, the first face being contained in the first plane (17), the output aperture (28) comprises a cylindrical recess (29) with cross section d", having a main axis (30) going through the centre of the second face of the cylindrical recess (21) of the input aperture (20), the first plane (17) forms an angle α with the normal of the second plane (18).

4. A plasma source emission spectrometer according to claim 3, characterised in that the main axis (30) of the cylindrical recess (29) of the output aperture (28) of the sighting device (100) is tilted by an angle β with respect to the normal of the first plane (17).

5. A plasma source emission spectrometer according to claim 3, characterised in that the sighting device (100) has a metallic structure (13) whereof the shorter axial length l is sufficient to provide the mechanical handling of the device.

6. A plasma source emission spectrometer according to claim 3, characterised in that the sighting device (100) has an input aperture (20) which is not centred on the first face (15) of the metallic structure (13).

7. A plasma source emission spectrometer according to claim 3, characterised in that the first face (13) of the metallic structure (12) of the sighting device (100) exhibits a first (24) and second (25) threaded cylindrical recesses which do not emerge on the second face (16).

8. A plasma source emission spectrometer according to claim 7, characterised in that the respective centres (26–27) of the first (24) and second (25) recesses of the sighting device (100) are diametrically opposed on a circle with diameter D' centred on the input aperture (20).

9. A plasma source emission spectrometer according to claim 3, characterised in that the angle α of the sighting device (100) ranges between 5° and 20°.

10. A plasma source emission spectrometer according to claim 4, characterised in that the angle β of the sighting device (100) ranges between 1° arid 5°.

11. A plasma source emission spectrometer according to claim 3, characterised in that the sighting device (100) has a recess (33) formed in the second face (16) between two cylinders (34–35) centred on said second face (16), with axial length 1" and with respective diameters Ø and Ø'.

12. A sighting device (100) for a plasma emission spectrometer comprising a metallic structure (13), substantially cylindrical with axial length l and with cross section D having a first (15) and second (16) faces ranging respectively in a first (17) and second (18) planes, said first face (15) comprising an input aperture (18) for a beam (5) to be analysed and the second face (16) comprising an output aperture (28) for said beam (5), a metallic flange (36) with diameter d comprising a knife (37), centred and connected to the metallic structure (12) by a metallic sleeve (38), said sleeve (38) having a main axis (39) parallel to the normal of the second plane (18) and containing the output aperture (28) of the second face (16)

characterised in that:

the input aperture (20) comprises a cylindrical recess (21) with axial length 1' and with cross section d', having a main axis (22) parallel to the normal of the first plane (17), a first and second open faces, the first; face being contained in the first plane (17), the output aperture (28) comprises a cylindrical recess (29) with cross section d", having a main axis (30) going through the centre of the second face of the cylindrical recess (21) of the input aperture (20), and in that, the first plane (17) forms an angle α with the normal of the second plane (18).

13. A plasma source emission spectrometer to measure a sample comprising:

an excitation source (2) of said sample having a central excitation axis (3) and producing a plasma, an extraction enclosure (4) receiving a beam composed of ions, atoms and electrons (5) derived from the plasma and comprising an optical lens (10) collecting luminous radiations emitted by the atoms and the ions of the beam (5) and delineating an optical collection axis (14) with the input slit of an optical to analysis system, wherein the central excitation axis (3) is tilted with respect to the collection axis (14).

14. A plasma source emission spectrometer according to claim 13, characterised in that it comprises a sighting device increasing considerably the lifetime of the lens (100) comprising a metallic structure (13), substantially cylindrical with axial length 1 and with cross section D having a first (15) and second (16) faces ranging respectively in a first (17) and second (18) planes, said fast face (15) comprising an input aperture (20) for a beam (5) to be analysed, and the second face (16) comprising an output aperture (28) for said beam (5), a metallic flange (36) with diameter d comprising a knife (37), centred and connected to the metallic structure (13) by a metallic sleeve (38), said sleeve (38) having a mail axis (39) parallel to the normal of the second plane (18) and containing the output aperture (28) of the second face (16), and in that:

the input aperture (20) comprises a cylindrical recess (21) with axial length 1' and with cross section d', having a main axis (22) parallel to the normal of the first plane (17), a first and second open faces, the first face being contained in the first plane (17), the output aperture (28) comprises a cylindrical recess (29) with cross section d", having a main axis (30) going through the centre of the second face of the cylindrical recess (21) of the input aperture (20), the first plane (17) forms an angle a with the normal of the second plane (18).

15. A plasma source emission spectrometer according to claim 14, characterised in that the main axis (30) of the cylindrical recess (29) of the output aperture (28) of the sighting device (100) is tilted by an angle β with respect to the normal of the first plane (17).

16. A plasma source emission spectrometer according to claim 14, characterised in that the sighting device (100) has a metallic structure (13) whereof the shorter axial length 1 is sufficient to provide the mechanical handling of the device.

17. A plasma source emission spectrometer according to claim 14, characterised in that the sighting device (100) has an input aperture (20) which is not centred on the first face (15) of the metallic structure (13).

18. A plasma source emission spectrometer according to claim 14, characterised in that the first face (13) of the metallic structure (12) of the sighting device (100) exhibits a first (24) and second (25) threaded cylindrical recesses which do not emerge on the second face (16).

19. A plasma source emission spectrometer according to claim 18, characterised in that the respective centres (26–27) of the first (24) and second (25) recesses of the sighting device (100) are diametrically opposed on a circle with diameter D' centred on the input aperture (20).

20. A plasma source emission spectrometer according to claim 14, characterised in that the angle a of the sighting device (100) ranges between 5° and 20°.

21. A plasma source emission spectrometer according to claim 15, characterised in that the angle β of the sighting device (100) ranges between V arid 5°.

22. A plasma source emission spectrometer according to claim 14, characterised in that the sighting device (100) has a recess (33) formed in the second face (16) between two cylinders (34–35) centred on said second face (16), with axial length 1" and with respective diameters Ø and Ø'.

* * * * *